M. J. VINGUM.
MANURE SPREADER.
APPLICATION FILED OCT. 16, 1911.

1,102,462.

Patented July 7, 1914
3 SHEETS—SHEET 3.

Attest:

Inventor:
by Rogers, Kennedy & Campbell
Attys.

UNITED STATES PATENT OFFICE.

MARTIN J. VINGUM, OF STOUGHTON, WISCONSIN, ASSIGNOR TO MOLINE PLOW COMPANY, A CORPORATION OF WISCONSIN.

MANURE-SPREADER.

1,102,462.  Specification of Letters Patent.  Patented July 7, 1914.

Application filed October 16, 1911.  Serial No. 654,930.

*To all whom it may concern:*

Be it known that I, MARTIN J. VINGUM, a citizen of the United States, residing at Stoughton, in the county of Dane and State of Wisconsin, have invented certain new and useful Improvements in Manure-Spreaders, of which the following is a specification, reference being had therein to the accompanying drawing.

This invention relates to manure spreaders of the type in which the material is fed to the action of the distributing mechanism, and by the latter spread broadcast over the ground. Machines of this general type embody usually a wagon body provided with supporting wheels by which it may be drawn over the field, and by which, motion is imparted to the operative parts, the wagon body being formed with suitable means for moving or feeding the material therein toward the rear end, at which point the body is provided with a distributing mechanism very commonly in the form of a rotary drum with distributing teeth, the rotation of which, acts to detach the material from the end of a mass and throw the same upwardly and rearwardly from the body and over the surface of the ground. It is a desideratum in these machines that the wagon body be deep, so as to hold a large quantity of material, but this offers the objection that there must be employed a large distributing cylinder and driven at a high rate of speed to take care of a large mass of material. Furthermore, the clogging of the distributing mechanism by the compacted material containing large chunks is apt to occur, resulting in injury to and strain on the driving mechanism.

It is the aim of my invention to provide a manure spreader in which a large body of material may be handled without danger of clogging or risk of strain on or damage to the driving mechanism, and my invention consists broadly in means, coöperating with the distributing mechanism, for breaking up the material as it approaches the distributing mechanism and for feeding the same in its broken up condition thereto.

My invention in its broader aspects may be carried out in different forms of embodiment, that shown being but one form by way of example, and the construction which I prefer to adopt. It is manifest, therefore, that the invention is not limited to the particular form and construction of the parts shown, and it will be understood that the invention is not limited to any particular arrangement or details of the parts except in so far as such limitations are specified in the claims.

Figure 1:
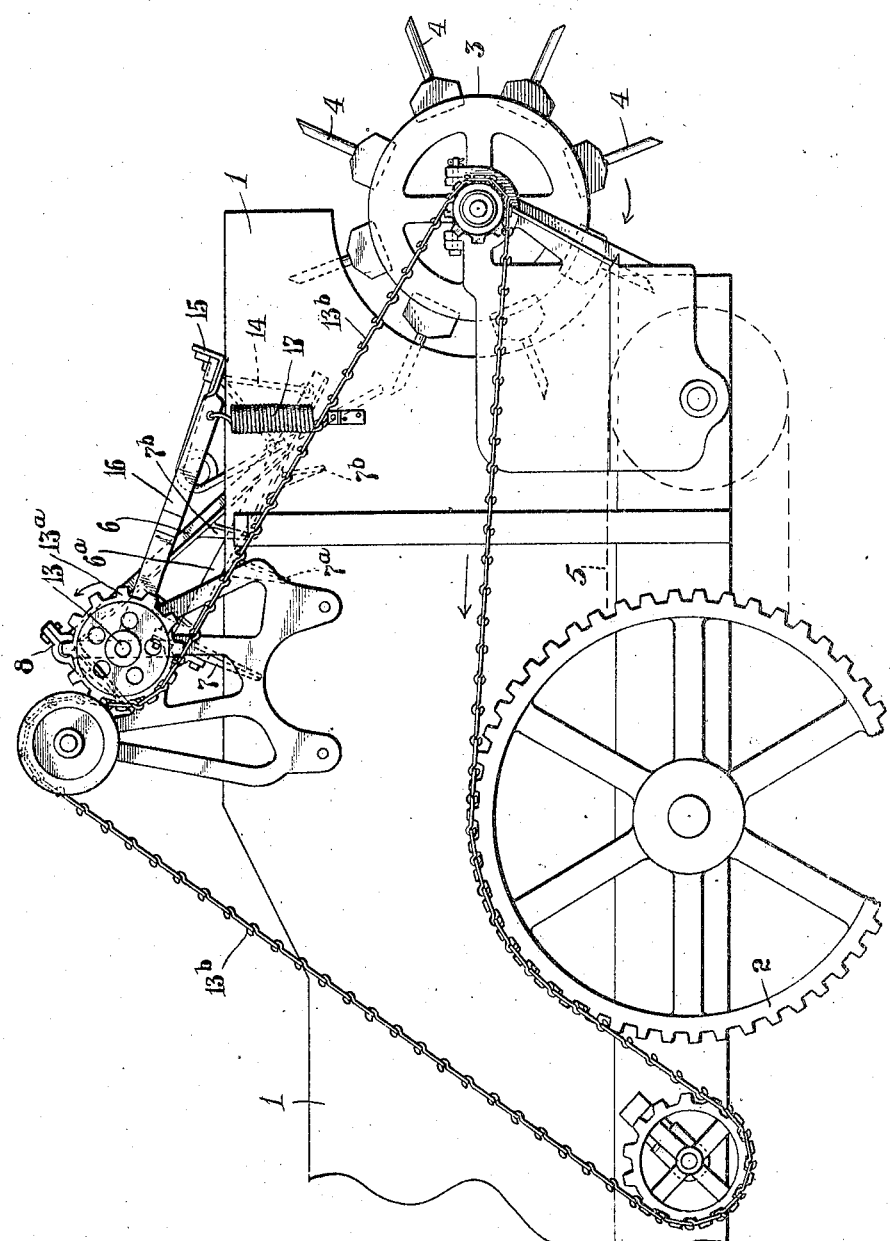
Figure 2:
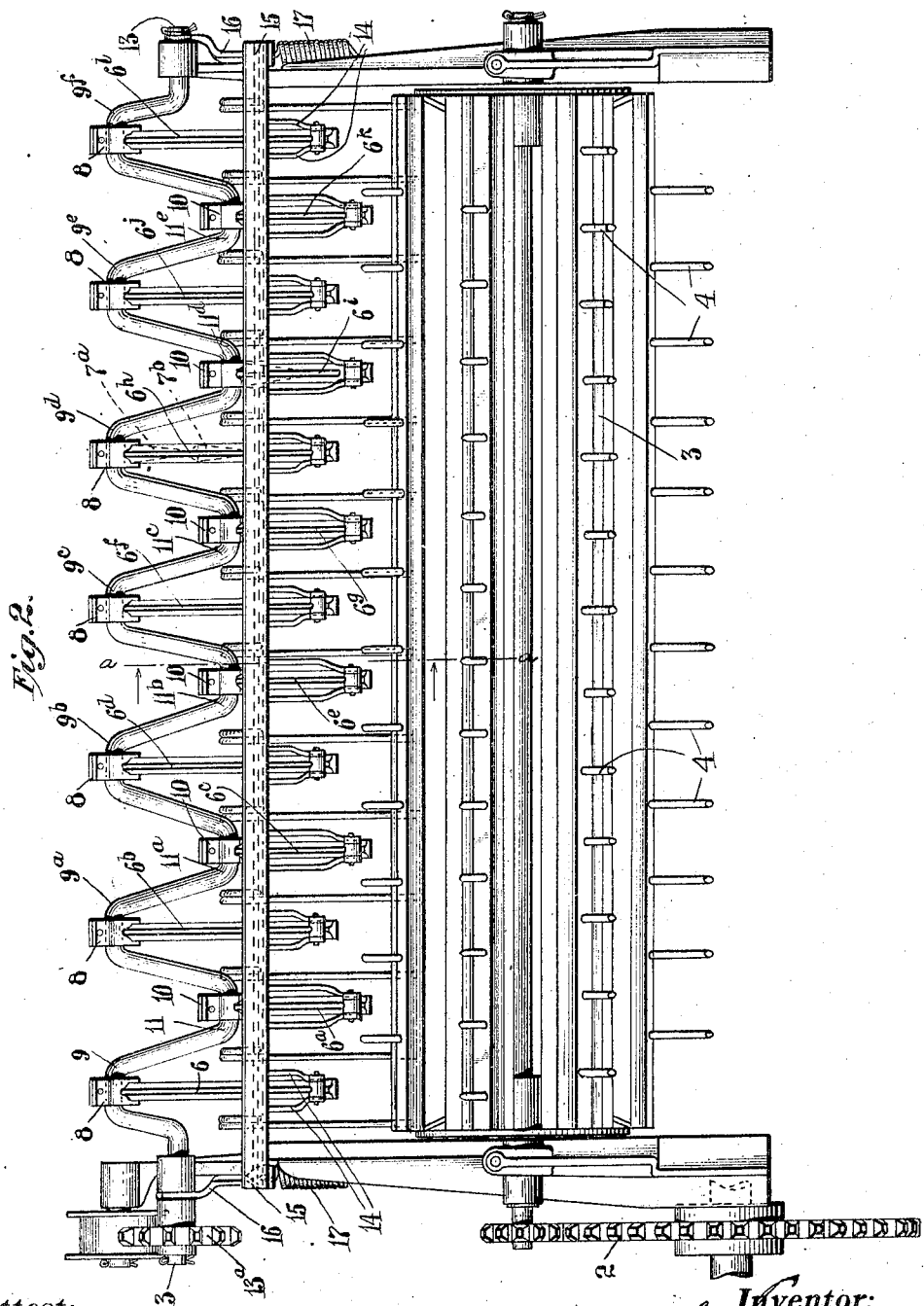
Figure 3:
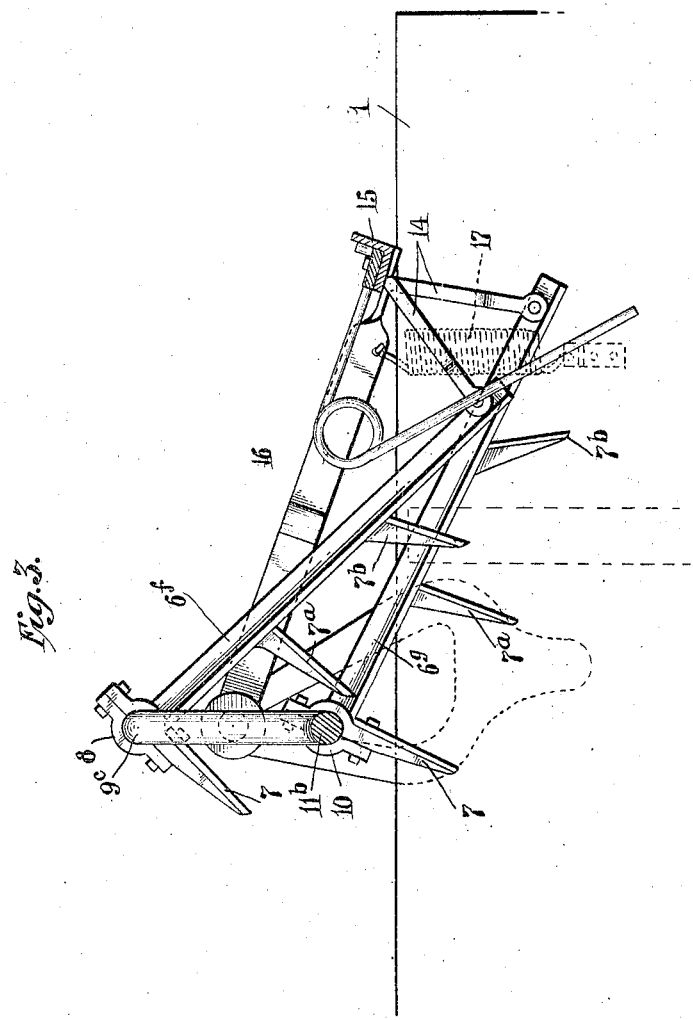

In the accompanying drawings:—Figure 1 is a side elevation of the rear portion of a manure spreader, constructed in accordance with my invention. Fig. 2 is a rear elevation of the same. Fig. 3 is a longitudinal sectional elevation on the line $a$—$a$ of Fig. 2.

In the form of mechanism shown in the drawings, 1 represents a wagon body or receptacle supported by ground wheels 2 and adapted to contain the material to be distributed, the rear end of the body being open and containing in this open end a distributing mechanism 3 in the front of a horizontal rotary drum or cylinder provided on its surface with a series of distributing teeth 4, which drum is adapted to be driven in any suitable manner, for instance from the ground wheels through the medium of a driving chain, and in the direction indicated by the arrow in Fig. 1. The wagon body or box is provided with suitable means for feeding the material therein rearwardly to the action of the distributing mechanism, such means being for instance in the form of the usual conveyer apron 5, on which the material rests and which is so driven by suitable means not shown, that the upper portion of the apron will move rearwardly. By the mechanism described, the distributing cylinder being rotated, and the apron set in motion, the mass of material filling the box and resting on the apron will be moved slowly rearwardly and its rear end presented to the action of the distributing mechanism, with the result that portions of the material will be detached from the mass and forcibly thrown by the teeth upwardly and rearwardly from the wagon.

In order that the material will be presented to the action of the distributing mechanism in the condition most favorable for its proper distribution, that is in a uniformly divided and broken-up condition, free from large chunks, I provide the mechanism shown in the drawings and which, in coöperation with the distributing mechanism, constitutes my invention. This mechanism is arranged in advance of the distributing mechanism so as to act on the upper portion of the material as it approaches the distributer, and in its preferred form it consists of a number of fore and aft extending rake bars 6, 6$^a$, 6$^b$, 6$^c$, etc., arranged side by side and provided with depending rake teeth 7, 7$^a$, etc. These rake bars are arranged in two series, those of one series being provided at their forward ends with bearings 8 mounted on cranks 9, 9$^a$, etc., while the rake bars of the other series are provided with bearings 10 mounted on cranks 11, 11$^a$, etc., alternating with the first named cranks, which cranks project in opposite directions from the axis of the crank shaft 13. As a result, the rotation of the crank shaft will cause the two series of rake bars to be reciprocated alternately in opposite directions. At their rear extremities the rake bars terminate adjacent the field of action of the distributing mechanism, at which point they are suspended, each by means of two links 14—14, from an overlying transverse supporting bar 15 resting upon the side walls of the wagon body, which bar has connected with its opposite ends the forward ends of arms 16—16 which extend forwardly and are mounted loosely on the axially alined journals of the crank shaft 13 before alluded to. The lower ends of the suspending links are provided on opposite sides of the rake bars on a horizontal transverse axis, while the upper ends are pivoted to the supporting bar on an axis parallel therewith, the result being that as the crank shaft is rotated and the front ends of the rake bars carried around in a circular path, the rear ends of the rake bars will swing back and forth subject to the supporting and guiding action of the links. The rake bars arranged and operated in the manner described, act on the upper portion of the mass of material as the latter approaches the distributing mechanism and in such manner that the material acted on will be broken up by the teeth on the bars and in this condition, and by reason of the reciprocating action of the bars, the material will be fed uniformly, evenly and effectively to the distributing mechanism. In the operation of the rake bars by the rotary cranks, and by reason of their linked suspension, the upper teeth of the bars will be entirely out of the manure in their upward movement and will penetrate the material deeply and firmly in their downward movement, the lower teeth being more or less embedded in the material at all times, so that the material is broken up and cut apart and reduced to a state of fineness by the time it reaches the distributing mechanism.

By reason of the fact that the supporting bar 15 is suspended by means of the end arms from the axis of the crank shaft, this bar may rise and fall, and it is held yieldingly down to its lowermost position, resting on the upper edges of the walls of the wagon body, by means of two springs 17—17, one at each end of the bar, the upper ends of the springs being connected with the bar and the lower ends connected with brackets fixed to the sides of the wagon body. The springs are of such tension that the bar will be held in operative position so as to properly sustain the suspending links, but will allow the bar to yield vertically in the event of undue pressure on the rake bars, which might be caused by the accumulation of material beneath the rake bars, the yielding of the bar 15 permitting the rake bars to move upwardly in series and bodily away from the mass of material.

The crank shaft 13 may be driven in any suitable manner in the direction indicated by the arrow, in order to impart to the rake bars their proper motion. In the drawings I have shown one end of the shaft as being provided with a sprocket wheel 13$^a$ under which is passed a driving sprocket chain 13$^b$ which may receive its power from any suitable source.

By reason of the action of the rake bars on the material as it approaches the distributing mechanism, the material is not only broken up and finely divided, but it is gradually fed in this condition in a uniform manner to the action of the distributing teeth. As a result it is not necessary to drive the beater cylinder at such high rate of speed as is customary, because the resistance it encounters is, by my improved mechanism, materially reduced and the material in its finely divided form is thrown out without undue or dangerous strain on the distributer and the parts driving the same. By means of my improved mechanism and as a result of the advantages and actions stated, I am enabled to employ a wagon body or box of unusual depth, with a correspondingly great capacity, and this without the necessity of driving the beater drum at a high rate of speed, or of employing a large beater drum, or of running any risk or liability of the clogging or stoppage of the mechanism.

Having thus described my invention, what I claim is:—

1. In a manure spreader, the combination of a distributing mechanism, means for feeding the material thereto, and a series of fore and aft longitudinally extending reciprocating bars provided at intervals in their length with depending rake teeth and arranged to act on the upper portion of the material in the general direction of its feeding movement.

2. In a manure spreader and in combination with distributing mechanism, means for feeding the material thereto, a series of fore and aft rake bars, rotary driving means connected at the upper ends of said rake bars, and suspending devices supporting said bars, in rear of the driving means.

3. In a manure spreader and in combination with distributing mechanism, means for feeding the material thereto, a series of reciprocating rake bars in position to act on the material as it approaches the distributing mechanism, said rake bars being yieldable bodily to and from the distributing mechanism.

4. In a manure spreader, the combination of a frame, a distributing mechanism thereon, means for feeding the material to the action of the distributing mechanism, a series of fore and aft reciprocating rake bars arranged to act on the material in advance of the distributing mechanism, driving cranks mounted in the frame and connected with the forward ends of said rake bars, a transverse bar sustained by the frame above the rear ends of the rake bars and movable vertically, swinging links suspending the rake bars from the transverse bar, and means for holding the transverse bar down yieldingly.

5. In a manure spreader, the combination of a frame, a distributing mechanism thereon, means on the frame for feeding the manure rearwardly to the distributing mechanism, two series of fore and aft extending reciprocating rake bars provided with depending rake teeth, said bars being arranged so that their teeth will act on the upper portion of the body of manure in advance of the distributing mechanism, two sets of driving cranks connected respectively with the two series of rake bars, and means for rotating the cranks to cause the two series of rake bars to move rearwardly and downwardly and then forwardly and upwardly respectively in alternation; whereby the upper portion of the material will, as it approaches the distributing mechanism, be subjected to a combined pulverizing and feeding action.

In testimony whereof I have affixed my signature in presence of two witnesses.

MARTIN J. VINGUM.

Witnesses:
  G. H. CARVER,
  H. H. HANSEN.